United States Patent
Ito et al.

[11] Patent Number: 5,964,016
[45] Date of Patent: Oct. 12, 1999

[54] LONG BAR MEMBER MACHINING APPARATUS

[75] Inventors: Masaru Ito, Kakogawa; Goro Yamazaki, Kobe; Toshiro Yamasaki, Kobe; Masahiro Awai, Kobe, all of Japan

[73] Assignee: Kawasaki Jukogyo Kabushiki Kaisha, Hyogo, Japan

[21] Appl. No.: 08/923,750

[22] Filed: Sep. 2, 1997

[30] Foreign Application Priority Data

Sep. 4, 1996 [JP] Japan ................................ 8-233840

[51] Int. Cl.⁶ ..................................................... B23B 7/00
[52] U.S. Cl. ............................. 29/27 C; 82/127; 82/148; 279/5; 279/14; 408/23; 409/159; 409/167; 409/172; 409/201; 409/211
[58] Field of Search ................................. 29/27 R, 27 C, 29/27 A; 409/145, 159, 165, 166, 167, 172, 201, 211; 82/129, 126, 127, 148, 162; 408/23; 279/5, 14

[56] References Cited

U.S. PATENT DOCUMENTS

| | | | |
|---|---|---|---|
| 1,830,981 | 11/1931 | Class | 279/5 |
| 2,850,790 | 9/1958 | Farnsworth | 279/5 |
| 2,948,542 | 8/1960 | Leifer | 279/5 |
| 3,661,050 | 5/1972 | Erikson | 409/167 |
| 3,691,879 | 9/1972 | Blake | 82/127 |
| 3,902,537 | 9/1975 | Donnelli | 279/5 |
| 3,978,565 | 9/1976 | Flisch | 29/38 B |
| 4,006,518 | 2/1977 | Rudolph et al. | 29/27 C |
| 4,048,879 | 9/1977 | Cox | 82/127 |
| 4,064,774 | 12/1977 | Maddock | 82/170 |
| 4,068,545 | 1/1978 | Scheler | 82/126 |
| 4,246,813 | 1/1981 | Grachev et al. | 82/127 |
| 4,483,052 | 11/1984 | Stuart | 409/167 |
| 4,571,796 | 2/1986 | Sellner et al. | 29/27 R |
| 4,785,525 | 11/1988 | Ishida et al. | 29/27 R |
| 4,800,790 | 1/1989 | Hasz | 82/31 |
| 5,052,089 | 10/1991 | Gadaud et al. | 29/27 R |
| 5,115,702 | 5/1992 | Link | 82/126 |
| 5,239,901 | 8/1993 | Lin | 82/119 |
| 5,289,622 | 3/1994 | Minagawa | 29/27 R |
| 5,313,694 | 5/1994 | Yonemoto et al. | 29/27 R |
| 5,343,603 | 9/1994 | Pioch | 82/127 |
| 5,392,501 | 2/1995 | Sonnek | 29/27 C |
| 5,490,307 | 2/1996 | Link | 29/27 C |
| 5,727,296 | 3/1998 | Kobler | 29/27 C |

FOREIGN PATENT DOCUMENTS

| | | | |
|---|---|---|---|
| 0659520 | 12/1993 | European Pat. Off. | |
| 3713515 | 4/1987 | Germany | |
| 63-200937 | 8/1988 | Japan | |
| 1-234101 | 9/1989 | Japan | 29/27 R |
| 5-26615 | 4/1993 | Japan | |

*Primary Examiner*—Daniel W. Howell
*Assistant Examiner*—Christopher Kirkman
*Attorney, Agent, or Firm*—Marshall, O'Toole, Gerstein, Murray & Borun

[57] ABSTRACT

In the case where a product having a free-curved surface is obtained, a machining work is performed by separate machine tools. Therefore, works of attaching and removing a half-machined product are necessary. Consequently, a lot of working time and labor are required. Also in an automatic production system, productivity is lowered if the system is stopped by failure in gripping during the attaching and removing works and an enormous equipment cost is required. A machining apparatus M comprises a main chuck head 1 having a control axis for holding and rotating a long bar member W, a head stock assembly 3 having three or more control axes, and a bar member feeder 5 for feeding the long bar member W to the head stock assembly 3. These four axes are simultaneously controlled to manufacture a plurality of products V having free-curved surfaces from the long bar member W. By the machining apparatus M, the products V having free-curved surfaces can be obtained from the long bar member W which is fed by the bar member feeder 5.

6 Claims, 5 Drawing Sheets

LONG BAR MEMBER MACHINING APPARATUS

FIELD OF THE INVENTION

The present invention relates to an apparatus for taking a plurality of products having free-curved surfaces from a long bar member and a method thereof, and more particularly to an apparatus suitable for machining products having thin free-curved surfaces such as a steam turbine blade, and a method thereof.

DESCRIPTION OF THE RELATED ART

Conventionally, products having free-curved surfaces have been manufactured by a plurality of machine tools, some of which have simultaneously-controlled axes. As an example of the product having a free-curved surface, a blade has been used for a steam turbine. An example in which the steam turbine blade is machined will be described below. One bar member is machined by a plurality of machine tools to obtain one product (turbine blade). At machining steps, a root section is formed on one end of the bar member by a first machine tool, and a profile section (steam passage section) is then formed by another machine tool. The bar member is manually removed or attached on each machine tool(Prior art 1).

At a step of machining the turbine blade, a twisted blade should be formed on a surface, that is, a free-curved surface should be formed. Therefore, a machine tool having a plurality of simultaneously-controlled axes (four axes or more) is required. This machine tool has been disclosed in Japanese Patent Examined Publication No. HEI 5-26615, for example. Such a turbine blade has a dimension and size varied according to efficiency of the steam turbine, steam conditions and the like. For this reason, a small quantity of various products have been manufactured.

In recent years, electronic technology has been advanced rapidly. As a technique for implementing FA (Factory Automation) of a machine shop, an automatic production system such as FMS (Flexible Manufacturing System) has been developed. Such an automatic production system automatically performs delivery of a raw member, rough machining, handling, transfer, finishing and the like (Prior art 2).

According to the Prior art 1, however, it is necessary to perform two steps of machining a root section and a profile section by separate machine tools. Furthermore, works of forming the root section on the bar member and then removing and attaching the bar member to another machine tool are manually performed. Therefore, a lot of time and labor are required. In the case where the machining time taken for each step, for example, of machining the steam turbine blade or the like is short, the attaching and removing works should be performed frequently and at short interval. Accordingly, the machine operators to handle the machine tools should be stuck to the machine tools whole time other than the real handling time of the attaching and removing works. Consequently, the works have very poor productive efficiency.

According to the Prior art 2, the machining step is divided into a plurality of steps. At each step, attachment, removal and delivery are automatically performed. For this reason, when automatically attaching and removing bar member and half-machined product, whole equipment should be stopped if gripping is failed. Thus, there is a possibility that productivity might be deteriorated. In addition, in the case where a small amount of various products are manufactured, machining time for each step cannot be equalized depending on the kinds of the products to be machined. For this reason, while a machine tool used at a step taking long machining time is operating, a machine tool used at a step taking short machining time does not operate in some cases. Consequently, there is a higher possibility that an operation rate of the whole equipment might be lowered. Furthermore, a computer for controlling machine tools, a delivery system and the like is required and a program for automatically performing manufacturing steps becomes complicated so that an equipment cost is greatly increased.

Machining of other products having no free-curved surface also have these problems.

SUMMARY OF THE INVENTION

In order to solve the above-mentioned problems, it is an object of the present invention to provide a long bar member machining apparatus comprising a main chuck head having one control axis for holding and rotating a long bar member, a head stock assembly having three or more control axes, and a bar member feeder for feeding the long bar member to the machining position by a predetermined distance, wherein at least four axes are simultaneously controlled to obtain a plurality of products having free-curved surfaces from the long bar member.

If the long bar member fed by the bar member feeder is machined by a cutting tool provided on the head stock assembly having a plurality of simultaneous-control axes by means of the single machining apparatus, all steps are subjected to machining operation so that a plurality of products having free-curved surfaces can continuously be obtained.

The present invention provides a long bar member machining apparatus comprising a main chuck head having a control axis for holding the long bar member in a predetermined position and for rotating the long bar member around the axis, a machine bed for supporting the main chuck head, a head stock assembly having at least three control axes, that is, an axis for moving a cutting tool for machining the long bar member held by the main chuck head in parallel with the longitudinal axis of the long bar member, an axis for moving the cutting tool transversely in horizontal direction, and an axis for moving the cutting tool transversely in substantially vertical direction, the head stock assembly being provided on the machine bed, a bar member feeder for feeding, to a feeding side of the main chuck head, the long bar member from which a plurality of products are taken, and a controller for simultaneously controlling the four axes to continuously obtain the products having free-curved surfaces from the long bar member fed to the main chuck head by the bar member feeder. Above-mentioned product includes a finished or a half-finished product, and is machined by the long bar member machining apparatus according to the present invention.

Thus, the rotation of the long bar member held by the main chuck head, and the cutting tool provided on the head stock assembly which can be moved in directions of at least three axes, that is, the axis for movement parallel with the longitudinal axis of the long bar member, the axis for transverse movement in horizontal direction, and the axis for transverse movement in vertical direction are simultaneously controlled by the controller. Consequently, the product having a free-curved surface can be machined by the machining apparatus. Furthermore, if the long bar member obtained after cutting out the product is fed by the bar member feeder, a plurality of products can be taken therefrom.

If the control axis for causing the cutting tool provided on the head stock assembly to swivel around the vertical axis perpendicular to the longitudinal axis of the long bar member in a direction of the longitudinal axis of the long bar member is provided, and the five axes including the control axis are simultaneously controlled by the controller to continuously machine products having free-curved surfaces, a degree of freedom of machining is increased so that various cutting tools can be used to form free-curved surfaces easily.

If the long bar member machining apparatus further comprises a sub-chuck head for holding an end of the long bar member fed by the bar member feeder, a holding chuck provided on the sub-chuck head for holding the long bar member on a periphery, and a pressing chuck provided on the sub-chuck head for holding the long bar member by pressing an end face of the bar member, the internal stress and strain in the bar member caused during machining process can easily be released and the circumferential eccentricity on the end support section can easily be eliminated by recutting the end support section.

The present invention provides a long bar member machining method comprising the steps of causing an end of a long bar member from which a plurality of products are taken to protrude from an end face of a main chuck by a predetermined distance to hold a main chuck side, holding an end face of the long bar member by pressing the end face onto a pressing chuck(nail center) provided on the sub-chuck head and forming a support section on an end portion of the long bar member, releasing the pressed end face, and then holding the support section on a periphery by a holding chuck provided on the sub-chuck head to roughly machine the long bar member for a whole section of a product, releasing the held support section on the periphery and then pressing and holding an end face of the support section to machine for eliminating a circumferential eccentricity generated on the support section, releasing the pressed end face, and then holding the support section again on the periphery to finish the long bar member for a whole section of a product, releasing the held support section, and then pinching a tip portion of the finished long bar member to remove the support section and finish the end face, and cutting a main chuck side of the long bar member to divide a product from the long bar member, thereby finishing the product, wherein said steps are repeated to continuously obtain the products from the long bar member. Consequently, a plurality of products having free-curved surfaces can continuously be machined.

In the case where the product machined from the long bar member is a steam turbine blade, the profile section which has a thin free-curved surface can be machined efficiently, and has no machining strain.

If a root section of the steam turbine blade is formed on a tip side of the long bar member, the support section can easily be machined.

DETAILED DESCRIPTION OF THE INVENTION

Figure 1:
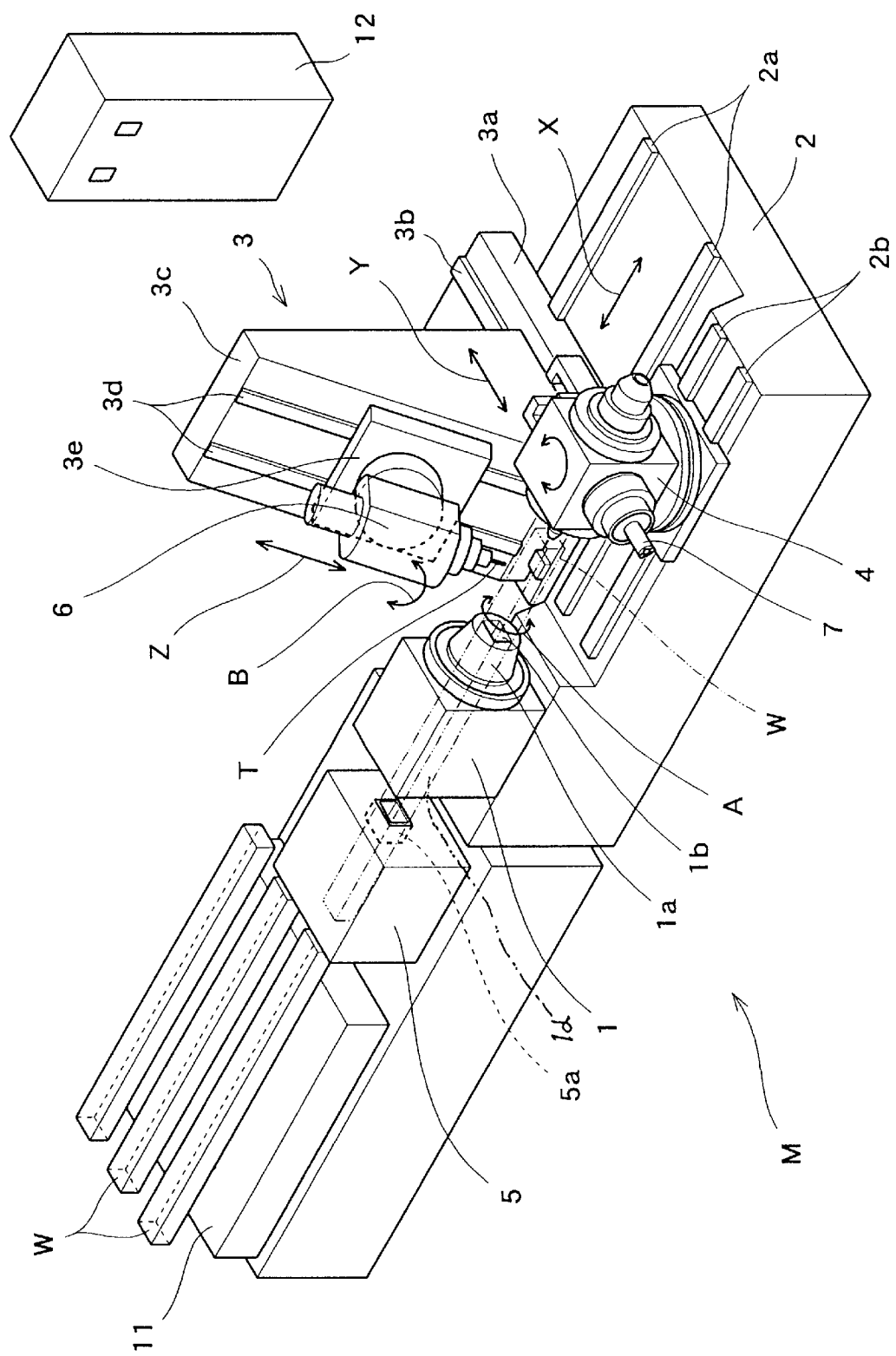
FIG. 1 is a perspective view showing an example of a long bar member machining apparatus according to the present invention. In this example, the vertical axis perpendicular to the longitudinal axis of the long bar member is optionally slanted.
Figure 2:
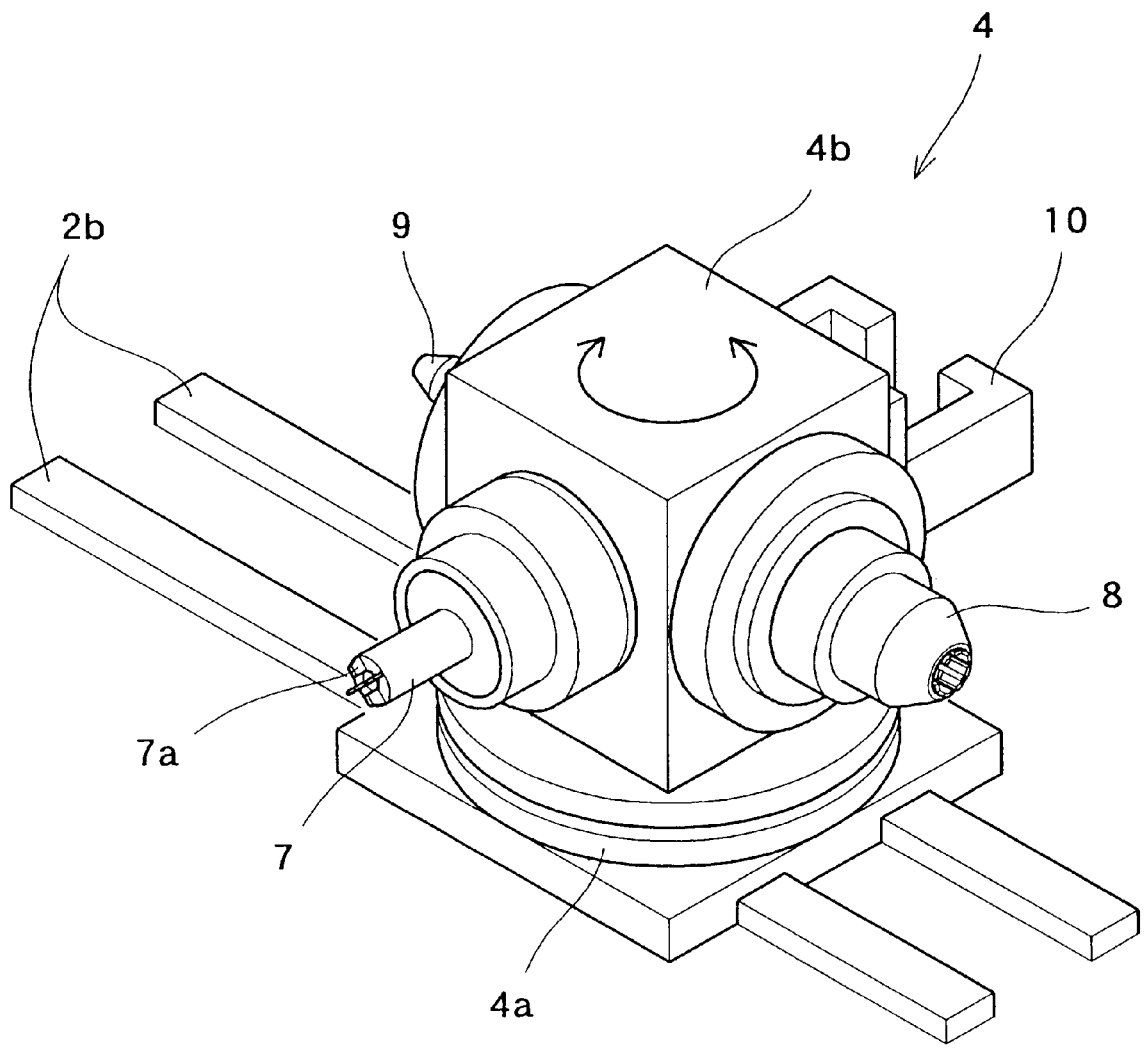
FIG. 2 is a perspective view showing a sub-chuck head of the long bar member machining apparatus shown in FIG. 1.

An embodiment of the present invention will be described below with reference to the drawings. FIG. 1 is a perspective view showing an example of a long bar member machining apparatus according to the present invention, and FIG. 2 is a perspective view showing a sub-chuck head of the long bar member machining apparatus shown in FIG. 1. In the present embodiment, a steam turbine blade will be given as an example of a product. Therefore, an example in which a long bar member having a square section is machined will be described below.

As shown, a long bar member machining apparatus M comprises a main chuck head 1 for holding a long bar member W in a predetermined position and rotating the long bar member W around an axis, a machine bed 2 for supporting the main chuck head 1, a head stock assembly 3 provided on the machine bed 2, a sub-chuck head 4 provided opposite to the main chuck head 1, and a bar member feeder 5 for feeding, to the main chuck head 1, the long bar member W from which a plurality of products can be taken. The long bar member W is rod-shaped and has such a length that two or more products can be manufactured. It is sufficient that one long bar member W is continuously machined to obtain a plurality of products. This product is finished or semi-finished, and is completely machined by the long bar member machining apparatus M.

The main chuck head 1 includes a main chuck 1a having an opening 1b provided on a center thereof. The long bar member W is inserted into the opening 1b. Thus, the main chuck head 1 has a structure in which the long bar member W inserted into the opening 1b from a back side 1d of the main chuck head 1 by the bar member feeder 5 penetrates the main chuck 1a and protrudes by a predetermined distance. The long bar member W may be held by a mechanism equivalent to a chuck provided on an ordinary machine tool, or may be supported on a periphery. Furthermore, the main chuck 1a has a structure in which the long bar member W held by the main chuck 1a can be rotated around a control axis A by rotation of the main chuck 1a.

The head stock assembly 3 is provided with a cutting tool T for machining, into a predetermined shape, the long bar member W fixed onto the machine bed 2 at a predetermined distance by the main chuck 1a. For example, the cutting tool T may be a cutting tool such as an end mill cutter. The cutting tool T has such a structure as to be moved in directions of at least three control axes, that is, an X axis parallel with a longitudinal axis of the long bar member W, a horizontal Y axis perpendicular to the X axis, and a vertical Z axis perpendicular to the X axes. In the present embodiment, furthermore, the cutting tool T can swivel around the Z axis in a direction of the longitudinal axis of the long bar member W (that is, around a control axis B). A saddle 3a of the head stock assembly 3 slides along a rail 2a provided on the machine bed 2 so that the cutting tool T is moved in the direction of the X axis. A column 3c slides along a rail 3b provided on the saddle 3a so that the cutting tool T is moved in the direction of the Y axis. A swivel head 3e slides vertically along a rail 3d provided on a front face of the column 3c so that the cutting tool T is moved in the direction of the Z axis. A spindle head 6 swivels around a predetermined axis of the swivel head 3e so that the cutting tool T swivels in the direction of the B axis. These structures are one of examples. Other structures can be used in such a manner that movement in the directions of the X, Y, Z and B axes can be performed.

Provided is a controller 12 for simultaneously controlling the straight axes X, Y and Z and the swivel axis B of the cutting tool T mounted on the head stock assembly 3 and the rotation axis A of the main chuck 1a. By simultaneously controlling these axes X, Y, Z, B and A, a product having a free-curved surface can be manufactured. If the simultaneous control axes have four or more axes including the rotation axis A of the long bar member W, the B axis is not necessary. In other words, the present invention is not restricted to the above-mentioned embodiment.

The sub-chuck head 4 has a plurality of chucks provided on a periphery as shown in a perspective view of FIG. 2. In the present embodiment, separate chucks are provided on four faces of a square support table 4b formed pivotably on the base 4a around a vertical axis. More specifically, there are provided a pressing chuck(nail center) 7 for pressing and holding an end face of the long bar member W, holding chucks(collet chucks) 8 and 9 for reducing a diameter and holding the long bar member W on a periphery, and a pinching chuck(work holder) 10 for pinching a machined product. The pressing chuck 7 is provided with a protruding blade 7a having a tip formed like a cutter. The blade 7a cuts into the end face of the long bar member W by pressing force to hold the long bar member W. In the present embodiment, furthermore, two kinds of holding chucks 8 and 9 for holding the end portion of the long bar member W on the periphery are provided to correspond to a diameter of a support section which is changed while machining the long bar member W. Accordingly, the sub-chuck head 4 has a function of automatically interchanging two kinds or more shapes of the end support section of the product which is being machined until the long bar member W is machined into a finished product. The chucks 7 to 10 can be rotated at an optional speed by driving means (not shown). The base 4a can be moved in an axial direction of the long bar member W over the rail 2b provided on the machine bed 2.

The bar member feeder 5 has such a structure that the long bar member W can be inserted into the main chuck 1a from a back side of the main chuck head 1. Provided is a transfer mechanism 5a for detecting that the long bar member W is inserted into the main chuck 1a by a predetermined length and for feeding and holding the long bar member W in a predetermined position. The detection can easily be performed by using a known sensor, for example. The predetermined length can also be set easily. Holding can be performed easily if a mechanism for performing press on the periphery is provided in the same manner as a chuck provided on a known machine tool. The bar member feeder 5 is controlled to automatically draw out the long bar member W having a length necessary for machining a next product and holding the same in a predetermined position when one finished product is cut out of the long bar member W.

A carrier 11 for feeding a plurality of long bar members W to the bar member feeder 5 is provided on a back of the bar member feeder 5. In the present embodiment, three long bar members W are shown for convenience. A lot of long bar members W can further be fed continuously. Consequently, a lot of products can automatically be machined more easily.

Figure 3:
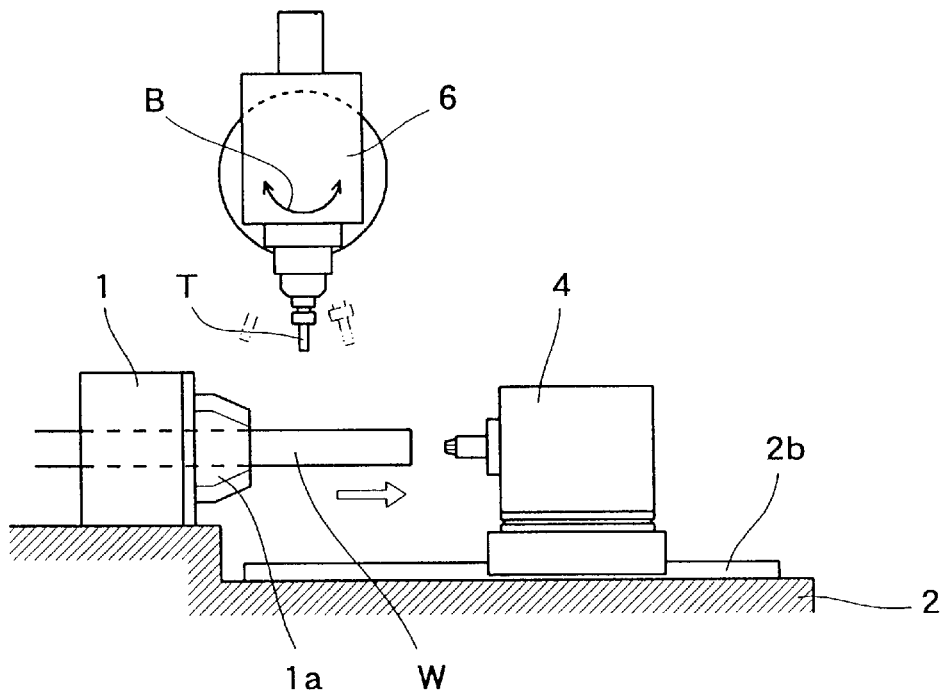
FIG. 3 is a side view showing a machining method according to the present invention, wherein the long bar member is protruded and held by a main chuck.
Figure 4:
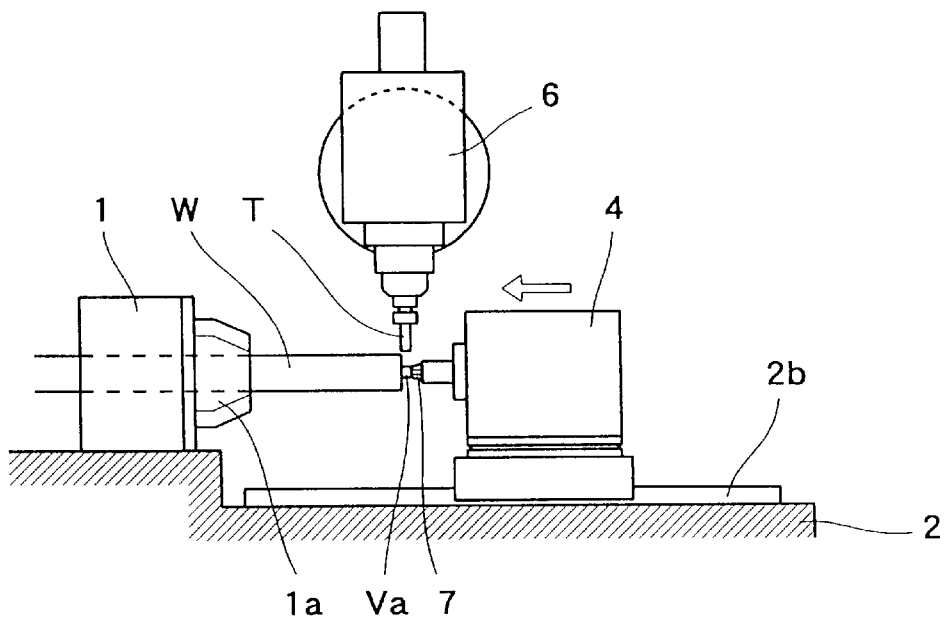
FIG. 4 is a side view showing the state in which a sub-chuck holding section is formed on an end portion of the long bar member.
Figure 5:
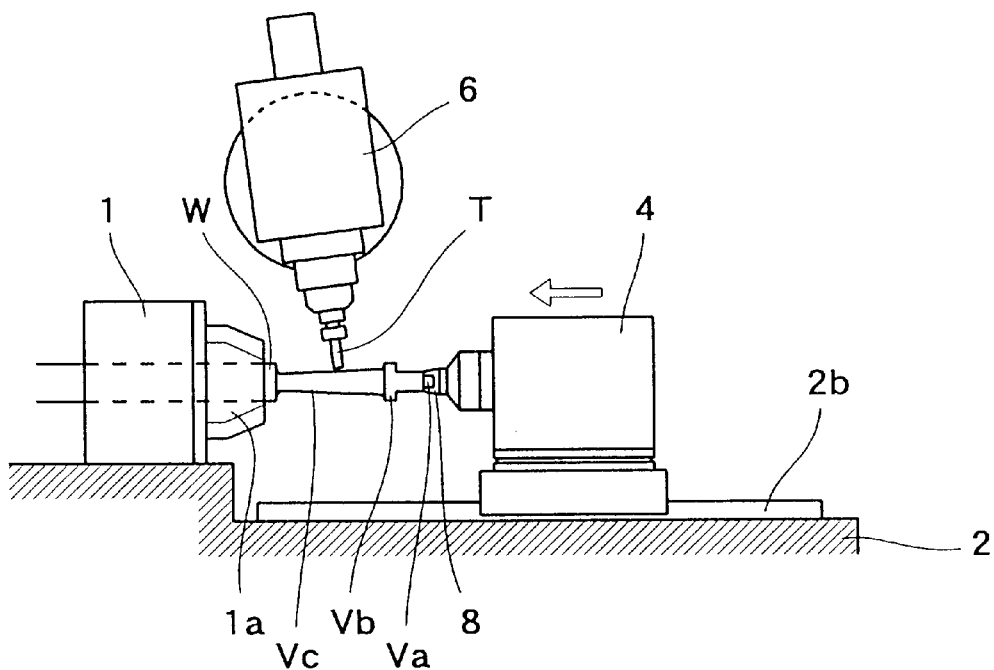
FIG. 5 is a side view showing the state in which a root section of a steam turbine blade and a profile section of a steam turbine blade are roughly machined.
Figure 6:
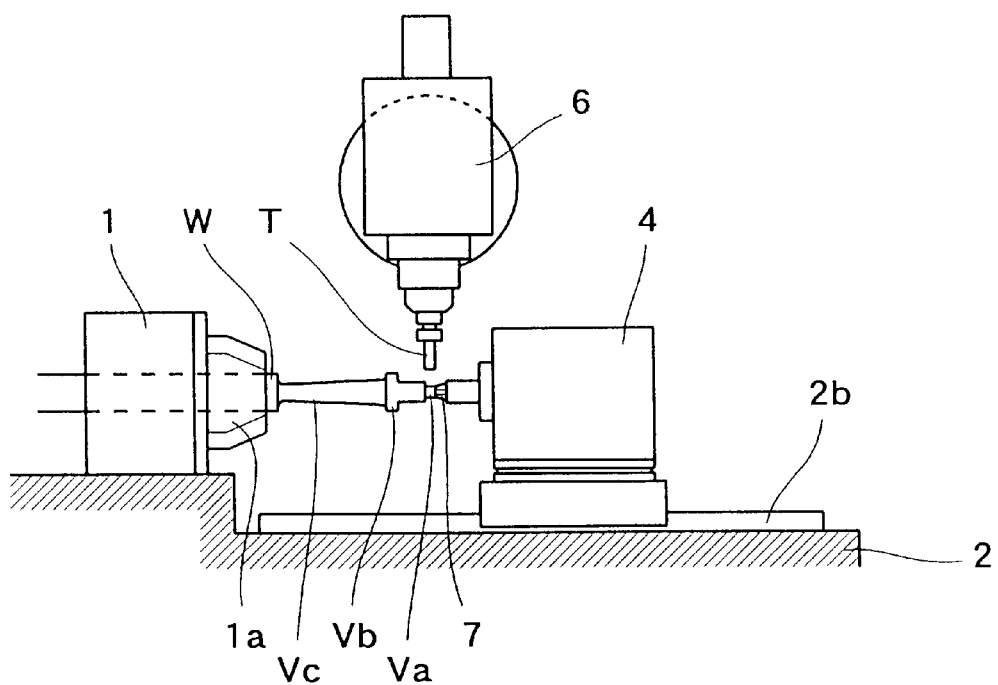
FIG. 6 is a side view showing the state in which the sub-chuck holding section is machined again.
Figure 7:
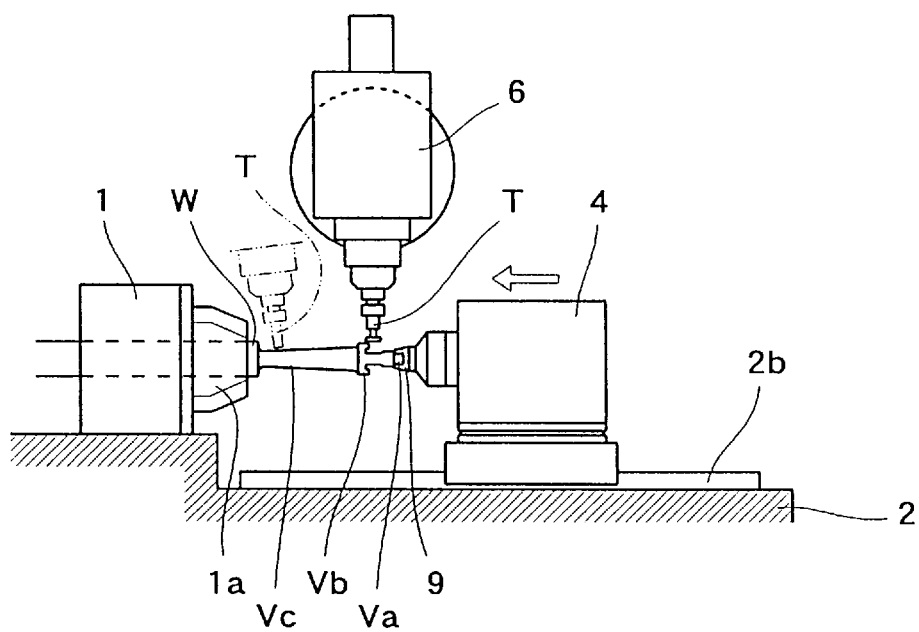
FIG. 7 is a side view showing the state in which the root section and the profile section are finished.
Figure 8A:
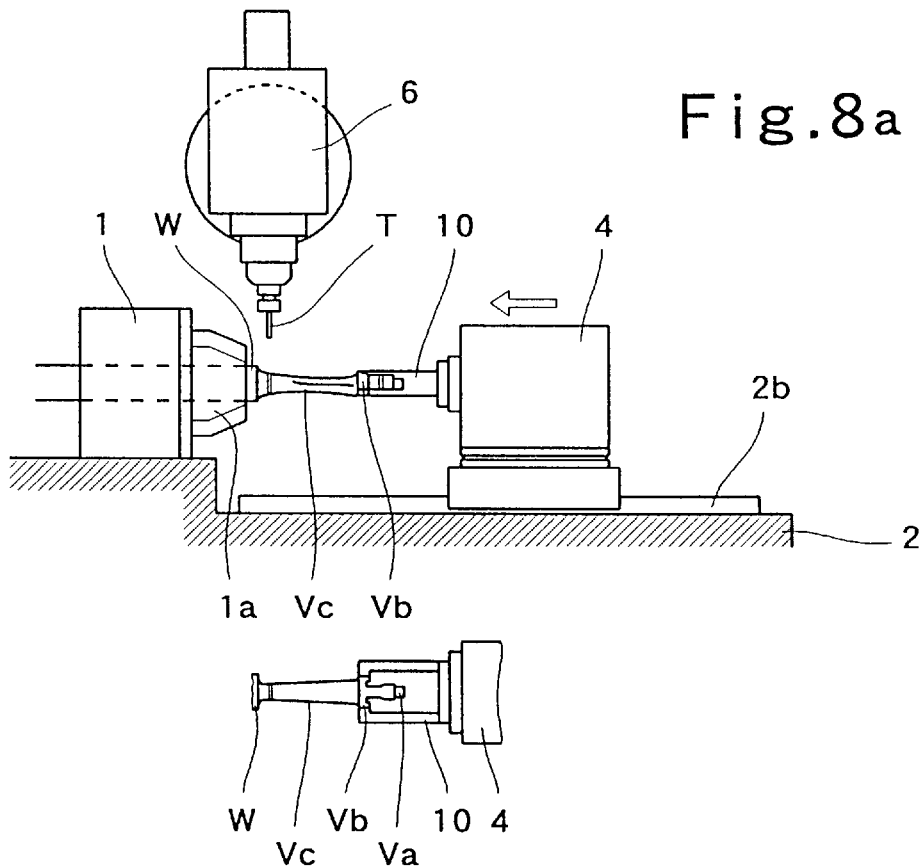
FIGS. 8(a) and (b) are side and plan views showing the state in which a product portion is cut out of the long bar member.
Figure 8B:
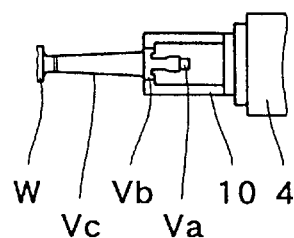

FIGS. 3 to 8(a) and 8(b) are diagrams showing a method of performing machining by using the long bar member machining apparatus M. FIG. 3 is a side view showing the state in which the long bar member W is held. FIG. 4 is a side view showing the state in which the sub-chuck holding section is formed on an end portion of the long bar member W in the state shown in FIG. 3. FIG. 5 is a side view showing the state in which the root section and the profile section are roughly machined in the state shown in FIG. 4. FIG. 6 is a side view showing the state in which the sub-chuck holding section is machined again in the state shown in FIG. 5. FIG. 7 is a side view showing the state in which the root section and the profile section are finished in the state shown in FIG. 6. FIGS. 8(a) and 8(b) are side and plan views showing the state in which a product portion is cut out of the long bar member W in the state shown in FIG. 7. As shown in FIGS. 3 to 8(a) and 8(b), the long bar member machining apparatus M can machine a plurality of products from the long bar member W in the following manner.

As shown in FIG. 3, the long bar member W from which two or more steam turbine blades are taken is inserted into the main chuck 1a from the back on the feeding side of the main chuck head 1, and is sent from the end face of the main chuck 1a and held by the main chuck 1a with protruding at a predetermined distance.

As shown in FIG. 4, the end face of the long bar member W is held by the pressing chuck 7 of the sub-chuck head 4, and a cylindrical support section Va is formed on the end portion of the long bar member W by the cutting tool T.

As shown in FIG. 5, the support section Va is released from the pressing chuck 7 of the sub-chuck head 4, and the sub-chuck head 4 is caused to pivot so that the support section Va is held by the holding chuck 8 on the periphery. At this time, the holding chuck 8 having a greater diameter is used. The cutting tool T is simultaneously controlled with five axes by the controller 12 to roughly machine the whole root section Vb forming the turbine blade and the profile section Vc. When performing rough machining by using the holding chuck 8 to finish a long steam turbine blade as a product, chattering is sometimes generated because the profile section Vc is thin. In this case, it is sufficient that the holding chuck 8 is rotated at the same speed synchronously with rotation of the main chuck 1a. In other words, the long bar member W is rotated by both the main chuck 1a and the holding chuck 8.

Milling is mainly performed for rough machining on the whole face. In the case where the profile section Vc is formed, a thickness is greatly reduced. Accordingly, fine strain is sometimes generated on the long bar member W by residual stress. In some cases, the strain causes a center of the support section Va to be shifted. If the turbine blade is completely finished with the residual stress left, the profile section Vc of the product might be deformed.

As shown in FIG. 6, the support section Va is released from the holding chuck 8 of the sub-chuck head 4 to make the sub-chuck head 4 side of the long bar member W free and the sub-chuck head 4 is caused to pivot, thus pressing and holding an end face of the support section Va of the long bar member W by the pressing chuck 7 in order to eliminate the strain of the long bar member W which is generated during wholly rough machining. At this time, since the sub-chuck head 4 side is made free and only the end face is then held by the pressing chuck 7 even if the strain is generated on the long bar member W, the long bar member W can be held co-axially with the main chuck 1a side. In this state, the support section Va formed on the end portion of the long bar member W is cut into a circle to eliminate a circumferential eccentricity generated by the strain. In the present embodiment, the support section Va can easily be machined by forming the root section Vb on the sub-chuck head 4 side which is an end side of the long bar member W.

As shown in FIG. 7, the pressing chuck 7 of the sub-chuck head 4 is released from the support section Va, and the sub-chuck head 4 is then caused to pivot, thus holding the support section Va formed concentrically with the main chuck 1a side by the holding chuck 9 having a smaller diameter. The cutting tool T is simultaneously controlled with five axes by the controller 12 so that the root section Vb forming the turbine blade and the profile section Vc are wholly finished. In some cases where the holding chuck 9 is used to finish a long steam turbine blade as a product, the product is elastically deformed in a direction of twist by a cutting load so that the predetermined accuracy cannot be obtained because the profile section is thin. In these cases, it is sufficient that the holding chuck 9 is rotated at the same speed synchronously with the rotation of the main chuck 1a. In other words, the long bar member W is rotated by both the main chuck 1a and the holding chuck 9. When machining the root section Vb of the turbine blade, special cutting tools are used. The cutting tool can be exchanged in the spindle head 6 by mounting a cutting tool exchanger capable of selectively attaching a plurality of tools in the same manner as a known machine tool.

In the present embodiment, the eccentricity of the support section Va is eliminated so that a diameter of the support section Va is reduced by cutting. Therefore, the holding chuck 9 having a smaller diameter is provided to perform gripping again. If the gripping can be performed by the holding chuck 8 having a greater diameter, the holding chuck 9 having a smaller diameter is not required.

As shown in FIGS. 8(a) and 8(b), the support section Va is released from the holding chuck 9 of the sub-chuck head 4 and the root section Vb of the turbine blade is then pinched by the pinching chuck 10 of the sub-chuck head 4. The support section Va formed on the tip is removed and the end face is finished and cutting is performed in a predetermined position on the main chuck 1a side of the long bar member W so that a product V can be obtained. The product V can be taken from the apparatus by a handling device such as a robot.

As described above, the turbine blade product V is obtained from the long bar member W. Since the long bar member W is sufficiently long, it is caused to automatically protrude at a predetermined amount by the bar member feeder 5 and is held by the main chuck 1a. By repeating the above-mentioned steps, thus, a plurality of turbine blade products V can continuously be obtained from the long bar member W.

By using the machining apparatus M according to the present invention, all machining steps of machining the steam turbine blade having a free-curved surface from a raw bar member can be performed. Accordingly, waiting time for each machine tool can be prevented from being generated due to a difference in machining time at each step as in the FMS. Consequently, a high equipment operation rate can be obtained. In the case where the steam turbine blades having different dimensions and shapes are selected as the products V, the different products V can continuously be manufactured easily by the single machining apparatus M if command values sent to the cutting tool exchanger and each control axis are optionally selected by the controller 12. Thus, a plurality of products V can be obtained automatically. Also in the case where plural kinds of steam turbine blades having different dimensions and shapes which can be cut out of the same long bar member W are selected as the products V, command values sent to the cutting tool exchanger and each control axis are automatically selected corresponding to the kinds of the products V by the controller 12 so that plural kinds of products V can automatically be obtained. Consequently, also in the case where a small amount of various products V are to be manufactured, productivity can be enhanced by efficient machining works. In addition, it is not necessary to attach and remove a half-machined product to and from the machine tool during machining. Furthermore, it is not necessary to deliver the half-machined product. Therefore, apparatus for automatically performing attachment, removal and delivery are not required. Thus, reliability can be enhanced and the whole apparatus can be small-sized with less increase in the equipment cost.

While the steam turbine blade has been described as an example of the product having a free-curved surface in the above-mentioned embodiment, the present invention can be applied to a work of machining other products having free-curved surfaces and is not restricted to the work of machining the steam turbine blade.

The present invention is embodied in the above-mentioned form and has the following effects.

By using the long bar member machining apparatus, a plurality of products having free-curved surfaces can continuously be obtained from the long bar member. Therefore, working time for attachment, removal and delivery of the half-machined product can be shortened and labor can be reduced so that all the steps can be performed efficiently. Thus, productivity can be enhanced. In addition, the equipment cost can also be reduced.

If the cutting tool can swivel, a lot of cutting tools can be selected so that a free-curved surface can be machined easily.

Furthermore, if the holding chuck for holding the long bar member on the periphery and the pressing chuck for pressing and holding an end face are provided on the sub-chuck head, circumferential eccentricity on a tip support section can be eliminated easily during machining. Thus, a product having high accuracy can be manufactured.

According to the long bar member machining method, a plurality of products having free-curved surfaces can efficiently be obtained from the long bar member. Therefore, all the steps are performed efficiently to shorten working time and to reduce labor. Thus, productivity can be enhanced.

In particular, if the steam turbine blade is machined, it is possible to efficiently manufacture a product having a profile section which has as a thin free-curved surface.

In addition, if the root section of the steam turbine blade is formed on the end side, the support section can easily be machined to eliminate strain during machining.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A long bar member machining apparatus for machining a plurality of products having free-curved surfaces from a long bar member, comprising:

a main chuck head having a rotation control axis for holding the long bar member in a predetermined position and rotation means for rotating the long bar member around the rotation control axis;

a machine bed for supporting the main chuck head;

a head stock assembly provided on the machine bed including a cutting tool and having at least three linear control axes and means for moving the cutting tool along said axes for machining the long bar member held by the main chuck head, including, a first linear means for moving the cutting tool along a first linear control axis extending parallel with a longitudinal axis of the long bar member, a second linear means for moving the cutting tool along a second linear control axis extending transversely to said longitudinal axis, and, a third linear means for moving the cutting tool along a third linear control axis extending in a substantially vertical direction with respect to the machine bed;

sub-chuck head for holding an end of the long bar member and provided on the machine bed opposite the main chuck head and with the head stock assembly intermediate the main chuck head and the sub-chuck head, the sub-chuck head including;

a holding chuck for holding the long bar member on a periphery during machining, and a pressing chuck for holding the long bar member by pressing an end face of the long bar member during machining, including a protruding tip portion cuttingly engaging the end face sufficient to hold the long bar; and a controller for simultaneously controlling the rotation means and the first, second and third linear means to continuously obtain the products having free-curved surfaces from the long bar member.

2. The long bar machining apparatus according to claim 1, wherein the head stock assembly includes swivel means for swivelling the cutting tool around a swivel axis perpendicular to the longitudinal axis of the long bar member, and the controller simultaneously controls the rotation means, the first, second, and third linear means, and the swivel means to continuously machine products having free-curved surfaces.

3. The long bar machining apparatus according to claim 2, wherein the sub-chuck head includes pivot means for pivoting the sub-chuck head to selectively position the holding chuck and the pressing chuck for respectively holding the long bar member during machining.

4. The long bar machining apparatus according to claim 3, wherein the pressing chuck is provided to hold the long bar member during initial forming of an end support section on the long bar member by the cutting tool, and the holding chuck is provided to hold the formed end support section of the long bar member during the subsequent rough machining of the long bar member.

5. The long bar machining apparatus according to claim 4, wherein following the rough machining of the long bar member the pressing chuck is provided to hold the end support section for cutting by the cutting tool to eliminate any circumferential eccentricity in the end support section which may have been formed during the rough machining.

6. The long bar machining apparatus according to claim 1, including a bar member feeder for feeding, to a feeding side of the main chuck head, the long bar member from which a plurality of products are obtained.

* * * * *